July 29, 1930. H. A. BRANDT ET AL 1,771,669
AWNING SHUTTER
Filed Jan. 29, 1929 5 Sheets Sheet 5
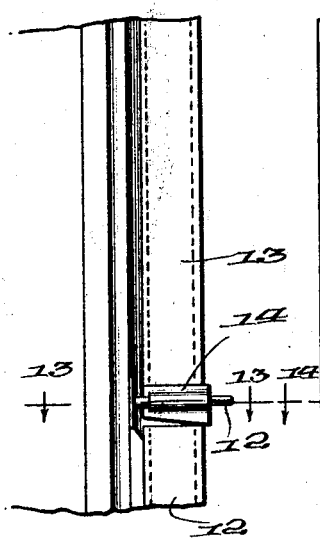
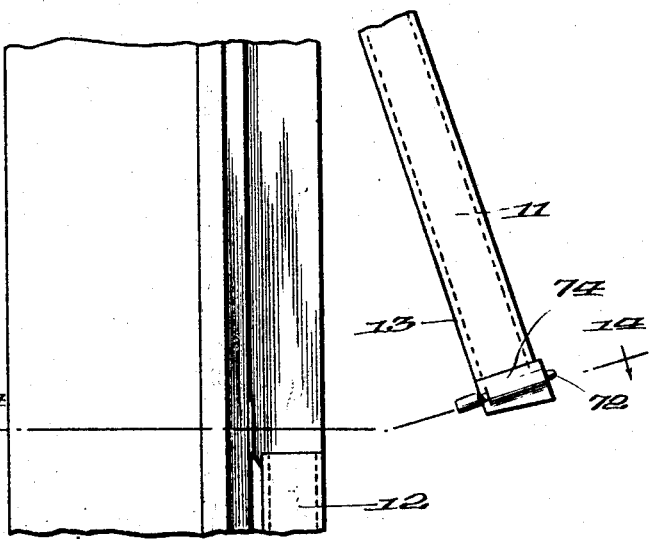
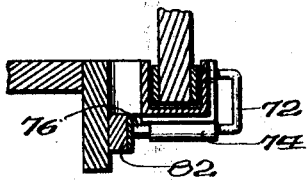
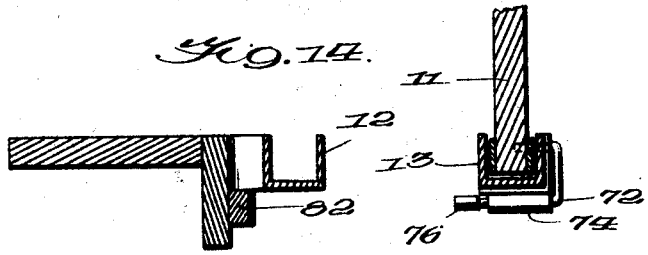
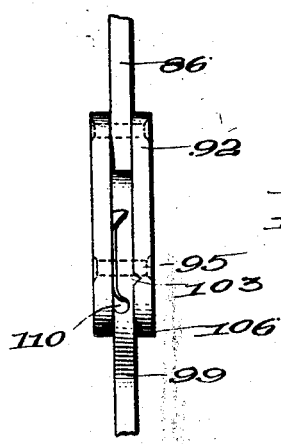
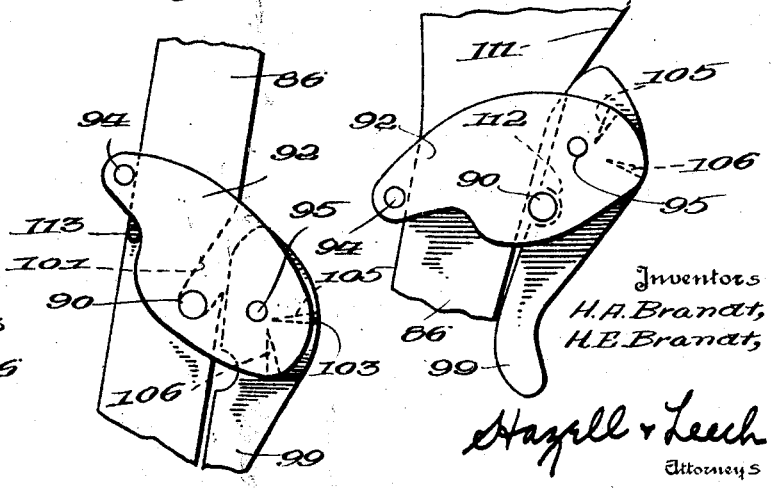
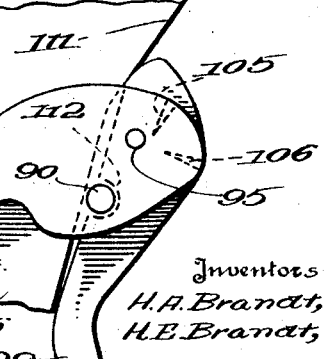
Inventors
H. A. Brandt,
H. E. Brandt,
Hazell & Leech
Attorneys Patented July 29, 1930

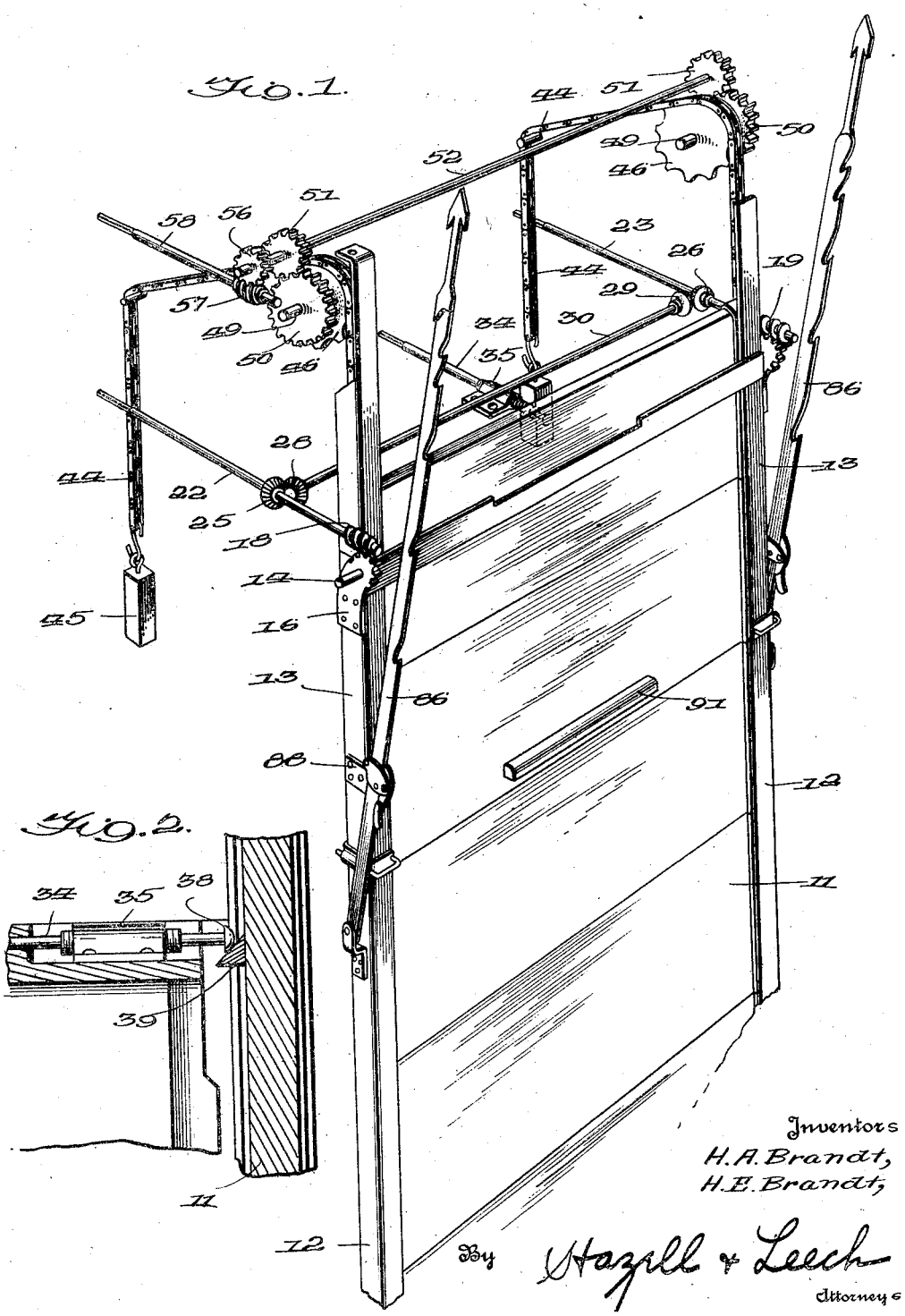

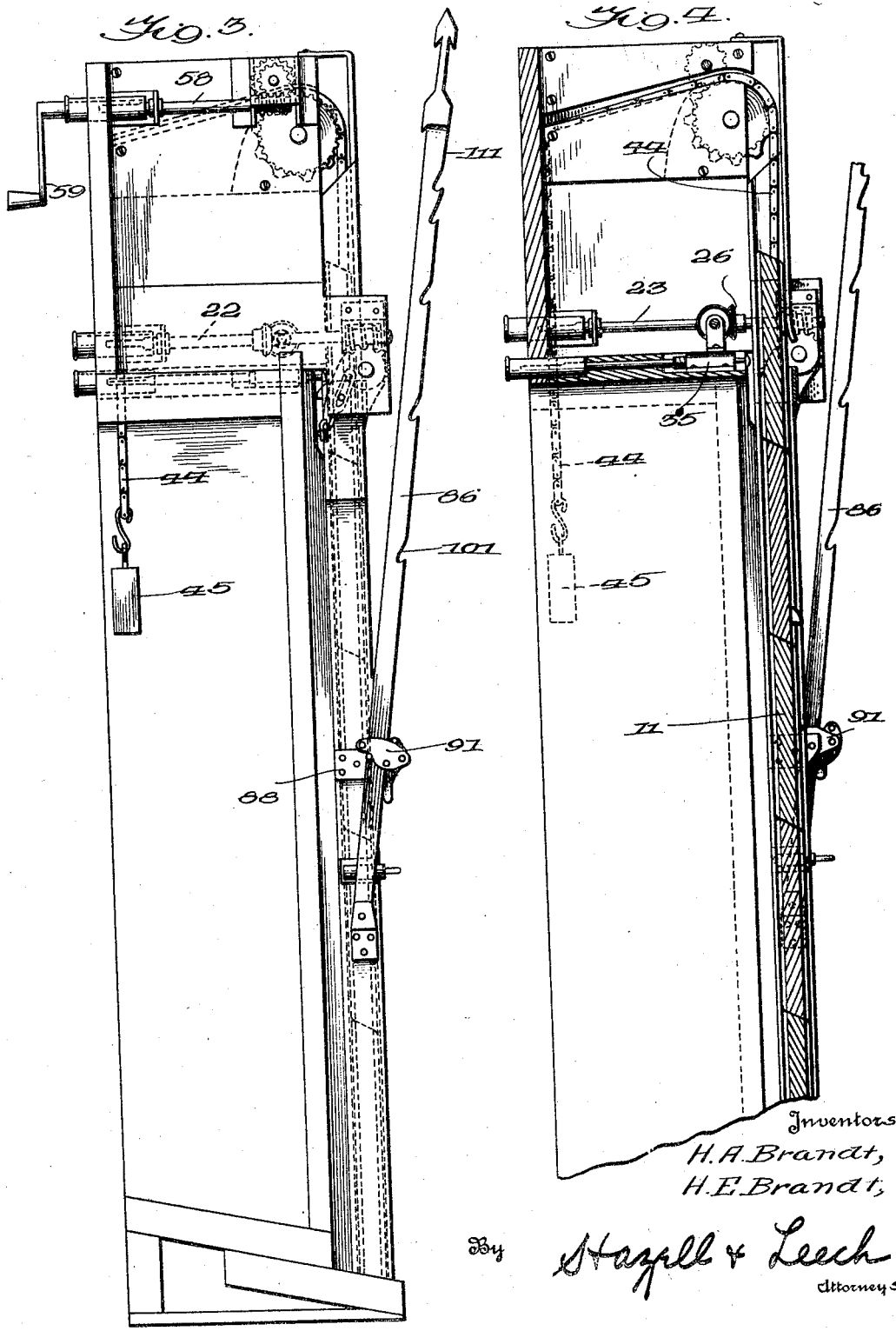

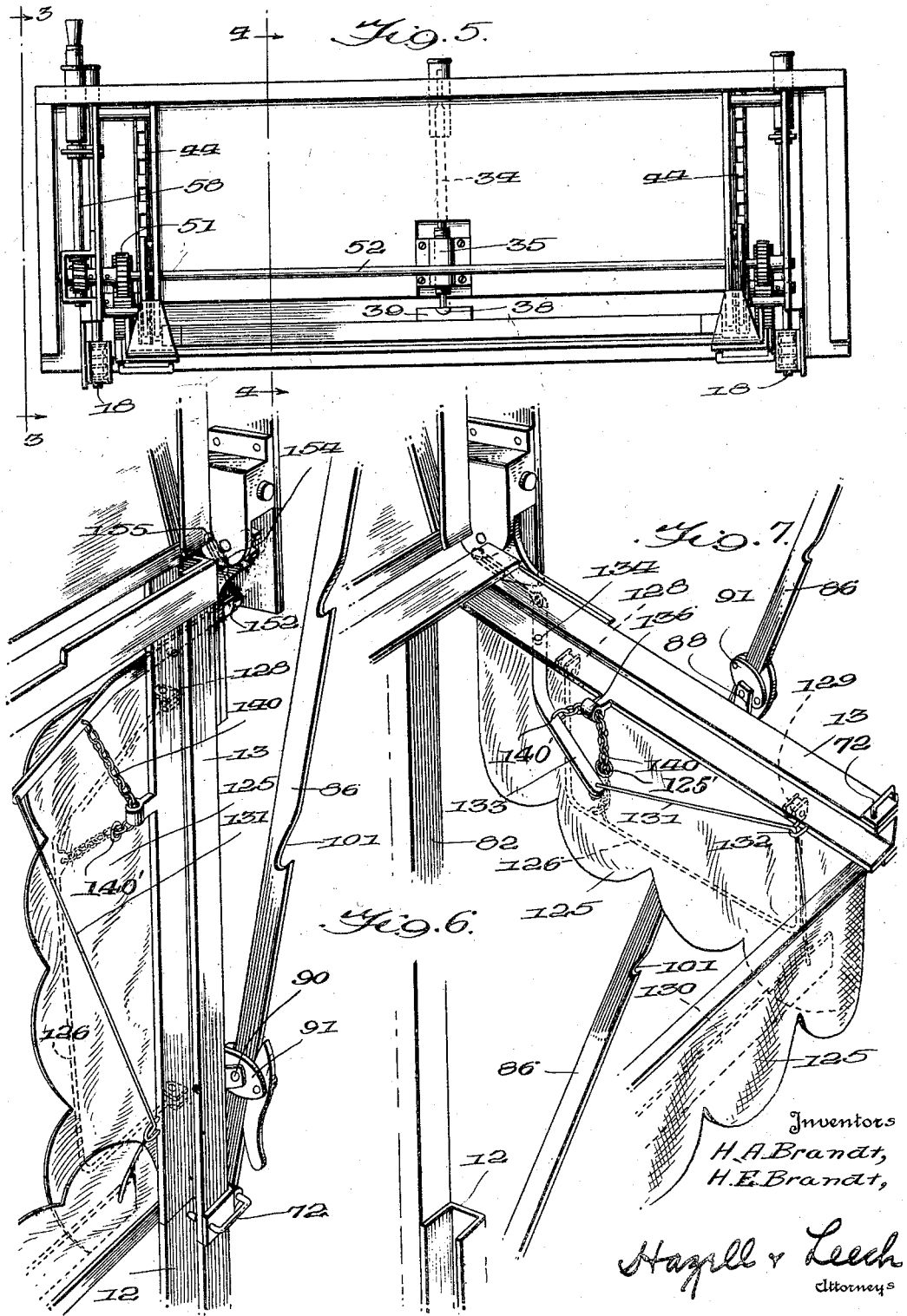

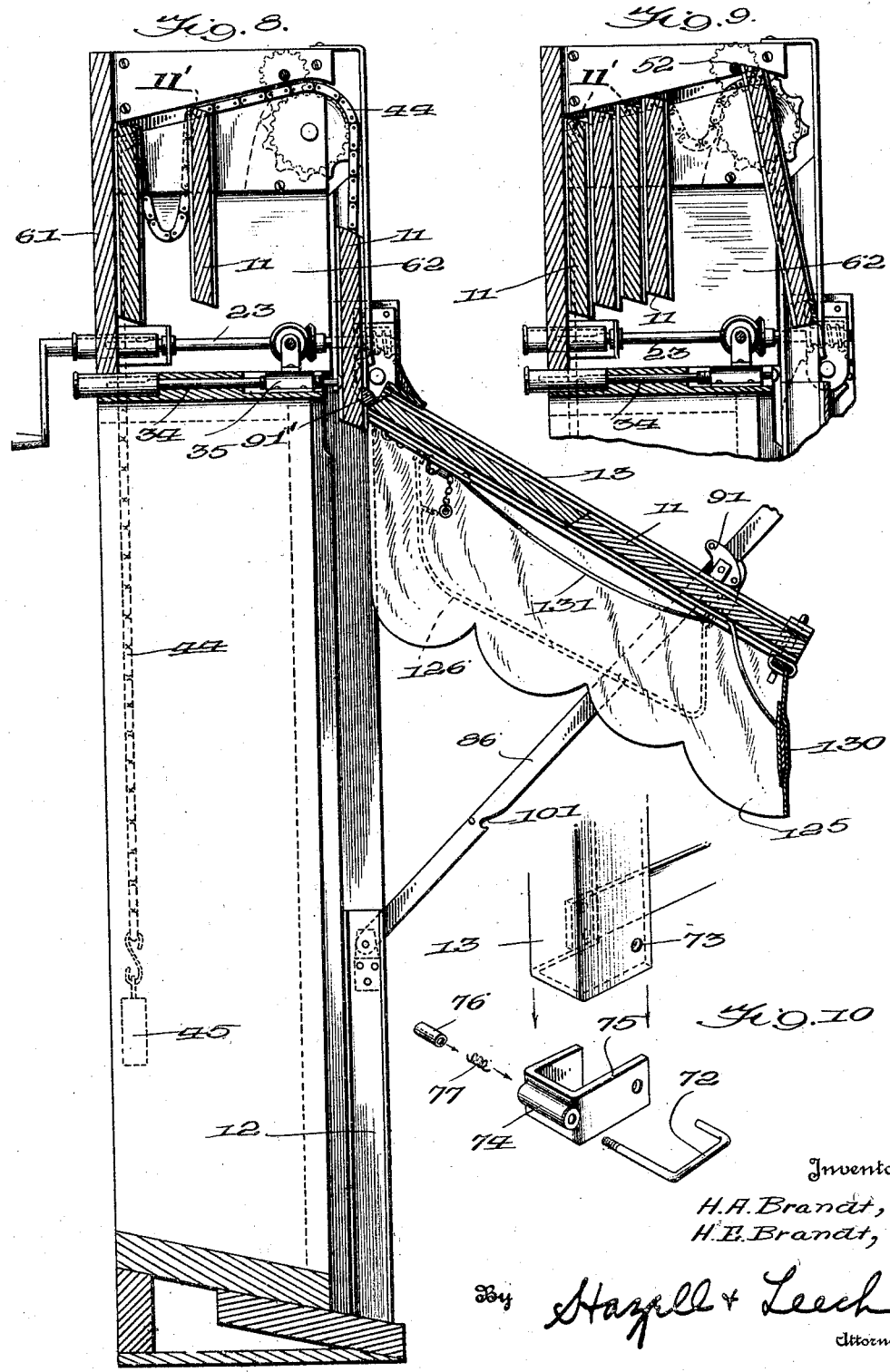

1,771,669

UNITED STATES PATENT OFFICE

HERMAN A. BRANDT AND HUGO E. BRANDT, OF MIAMI, FLORIDA

AWNING SHUTTER

Application filed January 29, 1929. Serial No. 335,826.

This invention relates to protecting devices, for example, for windows, to protect them against wind and rain storms, fire, sun, snow, window breakage and burglary.

An object of the invention is to provide a structure usable as an awning or as a shutter.

Another object is to provide such a structure that is equally efficient with casement or double hung windows.

Another object is to provide such a structure that is operated entirely from within the house, whether in use as an awning or as a shutter.

Still another object is to provide such a device which has a novel form of supporting means when used as an awning for either casement or double hung windows.

A further object is to provide means for mechanically storing out of sight the shutter sections at times when the invention is not called into use.

A still further object is to provide a stop-release device, also operable from within the house, for stopping the shutter sections at a predetermined point when the device is used as an awning.

Other objects include the provision of a shutter section guide, part of which swings the shutter sections into awning position, and, in connection therewith, devices for folding up and bringing into operative position the bottom awning fringe portion.

Additional objects, uses and advantages of the invention, including the provision of a shutter lock, will appear from the following description, taken in connection with the accompanying drawings, which illustrate, by way of example, a preferred embodiment of the invention, but which are not to be taken as a definition of the limits thereof, reference for that purpose being had to the appended claims.

The invention consists in the mechanism and devices hereinafter described in detail for carrying out the foregoing objects and others herein specified, and particularly pointed out in the claims.

In the drawings:

Fig. 1 is a perspective view showing the invention in shutter position, and illustrating the actuating mechanism, which, in practice, is located within a compartment in the wall and above the window frame, as indicated in Figs. 3 and 4;

Fig. 2 is an enlarged vertical sectional view showing a form of locking means for holding the shutter in the position of Fig. 1;

Fig. 3 is an end elevation, with the parts in shutter position, looking in the direction of the arrows;

Fig. 4 is a vertical sectional elevation, taken on the line 4—4 of Fig. 5;

Fig. 5 is a top plan view of the structure shown in Fig. 3;

Fig. 6 is a fragmentary perspective view illustrating the bottom awning fringe portion in closed or folded position;

Fig. 7 is a similar view of the same structure, illustrating the bottom awning fringe in operative awning position;

Fig. 8 is a vertical sectional elevation, showing the position of parts when the invention is used as an awning;

Fig. 9 is a fragmentary sectional elevation of the upper portion of Fig. 4 and showing the position of these parts when the invention is not in operative position, and the shutter sections are stored out of sight;

Fig. 10 is an enlarged detail group view, showing in perspective the stop-release device and its assembly, by means of which the shutter sections are stopped at the predetermined point when the device is used as an awning, and which releases to permit them to slide down to the bottom of the window frame when the invention is used as a shutter;

Fig. 11 is a fragmentary side elevation, illustrating the stop-release device in its clear position for allowing the shutter sections to pass downwardly to the bottom of the window;

Fig. 12 is a side elevation of the same structure, showing the parts in different position with the stop-release device in position to limit the downward movement of the shutter sections to a predetermined distance when the invention is used as an awning;

Fig. 13 is a horizontal sectional view taken on the line 13—13 of Fig. 11;

Fig. 14 is a horizontal sectional view taken on the line 14—14 of Fig. 12;

Fig. 15 is a fragmentary front elevation or edge view of the reversing slide associated with the shutter track and the awning supporting bars;

Fig. 16 is a fragmentary side elevation of the structure shown in Fig. 15;

Fig. 17 is a fragmentary side elevation of the same structure in the position it occupies when at its outermost position, where the stop pin of the slide is automatically shifted to inoperative position for lowering of the awning.

Referring in detail to the drawings, the invention includes shutter sections movable into and out of operative position and mechanism for operating these sections.

In the form of the invention herein illustrated, the shutter sections 11 are vertically slidable in a track or guide the lower portions 12 of which are illustrated as being fixed, and the upper portions 13 of which are pivotally mounted to swing outwardly together away from the lower track sections 12 in the manner illustrated in Figs. 7 and 8. For this purpose, the two upper track sections 13 are pivotally mounted on pins 14 and are provided with gear segments 16 fixed to the tracks 13 and meshing respectively with the worms 18 and 19 on worm shafts 22 and 23. These shafts are shown as being provided with squared ends for the reception of a crank handle such as that illustrated in Fig. 3. The two worm shafts 22 and 23 are provided with bevel gears 25 and 26 meshing respectively with bevel gears 28 and 29 on a shaft 30, so that both worms 18 and 19 will be actuated when either shaft 22 or 23 is rotated. The shafts are mounted in suitable bearings which, for the sake of clearness, have not been illustrated in Fig. 1.

The invention provides locking means for holding the shutter sections in the lowered position of Fig. 1, and, in the present form, this locking means is shown as comprising a shaft 34 threaded in a bearing 35 for axial movement when the shaft is rotated. At the forward end of the shaft 34 a locking head 38 is provided, which cooperates with a projection 39 on the inner face of the top shutter section so that when the shutter sections are in lowered position, they may be locked from the inside of the house by rotation of the shaft 34.

The shutter sections 11 (see Fig. 8) are provided with horizontally projecting pins 11' near their top edges, by which the sections are connected to the links of a pair of parallel chains 44. Counterweights 45 are provided on the ends of these chains so that the free ends of the chains will ride clear of the storage compartment. The chains 44 pass over sprocket wheels 46 fixed on aligned shafts 49, to each of which is also fixed a gear 50. Each gear 50 meshes with a gear 51 fixed on a shaft 52. The shaft 52 has fixed thereon a worm gear 56 in mesh with a worm 57 on shaft 58 so that rotation of the shaft 58 by means such as the crank handle 59 shown in Fig. 3 will cause the rotation of the sprocket wheels 46 for the purpose of raising or lowering the shutter sections.

When the shutter sections are raised to inoperative position, they are carried up by the chains 44 moving vertically in the track members 12 and 13 until they reach the highest point in the sprocket chain, after which they travel rearwardly and slightly downwardly as shown in Fig. 8, the end of the sprocket chain to which is attached the counterweight 45 moving downwardly until the top shutter section abuts against the rear wall 61 of the storage compartment 62 located above the top of the window frame, and, when the invention is used in connection with a house, within the house wall. Succeeding sections are brought into the storage compartment as the shaft 58 is rotated and move rearwardly and downwardly until they are packed as shown in Fig. 9, the sprocket chain forming depending loops between the shutter sections 11. For convenience, the lowermost shutter section extends sufficiently far above the points where it is attached to the sprocket chains to abut against a stop, as illustrated in Fig. 9, and this stop may conveniently be the shaft 52, already described.

The shutter sections are preferably mounted on the sprocket chains sufficiently far apart from each other so that when the sections are being brought to their lowered position, they are spaced apart from each other by any predetermined distance, such as an inch or two. With this construction, the lowering of the shutter sections may be stopped as soon as the lowermost section touches the bottom of the window frame or embrasure, thereby permitting ventilation through the spaces between the shutter sections. Continued rotation of the shaft 58, however, will bring each shutter section into contact with the one next below it, as shown in Figs. 1 and 4. On raising the shutter sections by rotation of the shaft 58, the uppermost section begins to move first until the predetermined slack in the sprocket chains is taken up, whereupon the next section begins to move upwardly, the remaining sections following in a similar manner.

The operation of the invention as a shutter to form a complete barrier for the window or a ventilating barrier will be obvious from the above description.

The invention may be used as an awning, and for this purpose a stop is provided in connection with the movable tracks 13. Referring particularly to Fig. 10, the stop as herein shown comprises a U-shaped locking pin 72, one end of which is adapted to project through an opening 73 in the track 13, and the other end of which passes through the cylindrical casing 74 on the side of a bracket 75, this end of the pin 72 being threaded into a spring abutment 76 for cooperation with a coil spring 77 within the casing 74, so that the locking pin 72 is constantly urged inwardly or towards the window. When the tracks 13 are in the position of Fig. 1, the end of the pin projecting through the casing 74 abuts against a fixed frame piece 82 (see Fig. 7), thereby preventing the other end of the pin from entering the opening 73 in the track 13. If the shaft 22 is rotated very slightly, the tracks 13 will swing outwardly about the axes 14 by the mechanism above described, as shown particularly in Figs. 11 to 14 inclusive. As the tracks 13 begin to swing outwardly, the locking pin 72 begins to enter the opening 73, being urged in this direction by spring 77, so that by the time the abutment 76 has left the member 82, the locking arm of the pin 72 has entered its maximum distance into the track 13, thereby forming a stop member for the lowermost shutter section, so that if the sections are now lowered, they will not enter the track guides 12, but the lowermost section will come to a stop at the bottom of the tracks 13, and the next section will rest upon the first (see Fig. 8).

In the drawings two sections 11 are illustrated as being sufficient for the area between the tracks 13, though it is to be understood that any desired number of sections may be used. If desired, an abutment 91 may be provided on the outer face of one of the sections 11 so that when the shaft 22 is further rotated to bring the tracks 13 into the position of Fig. 8, this abutment member by resting on the next lower shutter section as shown in Fig. 8, will prevent further downward movement of any more shutter sections than the predetermined number desired for the tracks 13, and to aid in locking the shutter sections in awning position.

The invention may be used with hung windows or with casement windows, or sliding windows or doors. In the event it is used with casement windows opening outwardly, the tracks 13 can be raised to a horizontal position simply by continuing rotation of the shaft 22 beyond the point necessary to bring the tracks 13 to the position shown in Fig. 8.

The invention provides means for positively holding the guide tracks 13 in raised or awning position, and, as herein illustrated, there are provided for this purpose a pair of track or guide supporting rods 86, which are pivoted to the lower or fixed guides 12 and are connected to the tracks 13 by brackets 88 fixed to said tracks and pivotally connected by pins 90 to slides 91, these slides riding on the track supporting rods 86.

Referring particularly to Figs. 15 to 17, the slides 91 include a pair of side plates 92 spaced apart and embracing between them the supporting rod 86, the side plates 92 being connected together by pins 94 and 95. The pins 94 and 95 are spaced apart a distance somewhat greater than the width of the rods 86, and pivoted to the pin 95 of each slide is a movable tail piece 99 adapted to occupy two positions with respect to the remaining portion of the slide.

The pin 90 is adapted to enter notches 101 in the rod 86 in one of the positions of the slide and to ride past said notches in another position of the slide. For this purpose the tail piece 99 is provided with a lug 103 adapted to enter either of two notches 105 and 106 provided in the adjacent side plate 92 and urged in the direction of these notches by a spring 110, which is located between one of the side plates 92 and that side of the tail piece 99 opposite to the lug 103.

From the construction described it will be evident that the slide 91 is caused to travel toward the outer end of rod 86 as the tracks 13 are raised to awning position. As the tracks 13 are being so raised, the slide is in the position of Fig. 16, so that upon any retrograde movement of the tracks 13, the pin 90 will drop into one of the notches 101, thereby preventing further downward movement of the tracks 13. As the raising movement proceeds, however, the slide 91 is moved further and further towards the outer end of the rod 86 until, as it nears the end of said rod, the forward end of the tail piece, as shown in Fig. 17, rides up on an inclined portion 111 of the rod 86, causing lug 103 to ride out of the notch 105 and into notch 106, thereby bringing the slide parts to the position of Fig. 17. At this point it is evident that the bracket 88, which is attached to the track 13, can move the slide 91 no further towards the outer end of the supporting rod 86. A cutaway portion 112 is provided in the tail piece 99, which is entered by the pin 90 in this position.

If now the guide tracks 13 are lowered out of awning position, the slide 91 will ride down the rod 86 in the position of Fig. 17, in which position it is held by the spring 110 so that the lower end of the tail piece 99 rides over the notches 101, thus preventing the pin 90 from entering any of said notches.

The slide is moved upwardly and downwardly by force exerted on pin 90. At the lower end of the travel of the slide, a pin 113, which is fixed in rod 86, is encountered by the side plates 92 as shown in Fig. 16, so that this end of the slide cannot move downwardly any further. As the lowering movement of the tracks 13 is brought to a conclusion, the pin 90 is lowered a sufficient distance to bring the parts of the slide to the position of Fig. 16, so that the lower end of the tail piece 99, being unable to move with plate 92, is brought to the position of Fig.

16, that is, the lug 103 is caused to ride out of notch 106 and into notch 105. This movement brings the slide into the proper position for the pin 90 to engage in one of the notches 101 upon any downward movement of the tracks 13 after they are again raised to awning position until the slide 91 has been brought out to the outermost end of its travel, where it is reversed to the position of Fig. 17, as already described.

Means are provided by the invention for bringing into awning position certain awning fringe elements or skirt members 125 (see particularly Figs. 6 and 7), and for moving or folding these awning elements out of awning position by downward movement of the tracks 13 out of awning position.

In the present embodiment, the flexible awning elements 125 are provided with hidden frame wires 126, which are pivotally mounted at 128 and 129 on the track members 13 so that they can be moved to the position of Fig. 6 or the position of Fig. 7. A similar front awning element may be provided if desired, which is preferably provided with a more or less rigid element 130, to the ends of which are fastened pull strings 131 passing through guides 132 fixed to the movable track members 13. The other end of each pull string 131 is fastened to the outer end of a lever 133 pivotally mounted at 134 on the underside of each track member 13. The lever 133 is movable on its pivot with respect to the track 13 into either of the positions shown in Figs. 6 and 7.

At a point 140' on the lever 133, which, in the position of Fig. 7, approaches relatively near the guide lug 136, fixed on track 13, when the lever is in the position of Fig. 7, and which point is relatively distant from the guide lug 136 when said lever is in the position of Fig. 6, is attached a draw chain 140. The other end of the draw chain passes through an eyelet 125' in the awning element 125 and is connected to the frame wire 126. It will thus be seen that if the lever 133 occupies the position of Fig. 7, only a relatively small portion of the chain 140 will lie between the lever and the lug 136, most of the chain being on the other side of said lug, thereby permitting the awning element 125 to hang downwardly in a vertical position. Also, the outer end of lever 133 has been moved nearer the front awning element so that the length of the draw string 131 between the lever and the draw string guide 132 has been decreased, allowing the front awning element 125 to occupy the vertical position of Fig. 7. When the lever 133 is moved to the position of Fig. 6, it moves away from the lug 136 and guide 132, pulling with it the chain and draw string and thus bringing the awning elements 125 to the position of Fig. 6, where they lie substantially parallel to the plane of the two movable tracks 13.

The invention provides means for moving the lever 133 to the position of Fig. 7 by movement of the tracks 13 into awning position, and for moving the lever 133 to the position of Fig. 6 by movement of the tracks 13 out of awning position and into the shutter position of Fig. 6.

For this purpose, as illustrated particularly in Figs. 6 and 7, the arm of the lever 133, extending beyond the pivot 134, is pivotally attached to an eye 152 of a link 154, which is slotted for limited movement in a vertical plane with respect to a fixed pin 155.

The operation of this mechanism is as follows. Assuming the parts to be in the position of Fig. 6, as the movable track guides 13 are raised to the awning position of Fig. 7, the lever 133 is moved in an arcuate path swinging upwardly with the underside of the track 13. This arcuate movement swings the link 154 in a counterclockwise direction about the fixed pin 155, as viewed in Fig. 6. The fixed pin 155 is located below and to the left of the axis about which the movable tracks swing, as viewed in Fig. 3, so that as the lever 133 swings outwardly and upwardly, moving the link 154 counterclockwise as viewed in Fig. 6, it also moves the eye 152 of the link further away from the fixed pin 155 and continues this movement until the far end of the slot contacts with the pin 155, thereby preventing further movement of the eye 152 away from said pin. Continued movement of the tracks 13 into the awning position of Fig. 7 results in the holding of the arm of the lever 133 attached to the eye 152 against further movement away from the fixed pin 155. Consequently, as the pivot 134 of lever 133 continues to swing outwardly and upwardly with track 13 away from the fixed pin 155, the forward end of the lever is moved with respect to the track 13 from the position of Fig. 6 to the position of Fig. 7, and thus causing, as already described, the awning elements 125 to move into awning position.

When the tracks 13 are lowered and are moving out of awning position towards the position of Fig. 6, the arm of the lever 133, which is attached to the eye 152, begins moving inwardly, approaching fixed pin 155, and pushing with it the link 154 until further movement of the link with respect to fixed pin 155 is prevented by contact of the pin with the end of the slot, after which the eye-attached end of the lever cannot move any nearer to the fixed pin 155. Further movement downwardly and inwardly of the pivot 134, due to continued movement of the tracks 13 out of awning position, consequently causes the lever 133 to move with respect to the track 13 from the position of Fig. 7 to the position of Fig. 6, thereby folding the awning members 125 out of awning position, as already described.

From the foregoing description it will be seen that a device has been provided which is operable for any of its purposes entirely from within the house, and may be operated by the simple rotation of a crank, and which affords adequate protection against sun, snow, extreme cold, fire, window breakage, burglary, rain storms, and high wind storms.

The device is efficiently usable not only in connection with casement or hung windows, or sliding windows and doors, but also as garage doors and as a protection to store fronts, showcases, etc.

The construction of the device permits it to be readily operated during a storm, and it also serves as an easily and simply operable means of closing a house when the occupants are to be absent for any considerable time.

The device is also usable in shutter position as a protection against the sun while permitting ventilation, for the shutter sections are so spaced apart on their chains that in lowering them into shutter position, each section follows the other at a spaced distance desired, for example, an inch, so that when the bottom section reaches its lowest point, the next following section moves an inch before contacting the bottom section. Thus all the sections may be lowered only down to the position of Fig. 1, or the sections may be lowered until the bottom section reaches its lowest position, in which case there will be the predetermined space, for example, of one inch, between the sections, thus affording ventilation and at the same time protection.

The shutter sections may be made of any desired material, such as glass or metal or wood, or a combination of them, and may be painted or striped to resemble the usual or any desired awning color designs.

Various changes may be made in the detailed construction above described by way of illustration without departing from the invention as defined by the following claims.

What is claimed is:

1. A protective attachment including a plurality of movable sections, guides in spaced apart relation therefor, apparatus for moving said sections along said guides in the same predetermined path, and mechanism for moving both guides and sections into a different path.

2. A protective attachment including a pair of parallel guides, apparatus for moving said guides while maintaining their parallel relation, a plurality of sections movable along said guides in spaced apart relation in a predetermined plane, and horizontally movable spring devices operable by movement of said guides for limiting the travel of said sections with respect thereto.

3. An awning shutter for windows, including guides movable into and out of awning position, shutter elements associated therewith, and side and front awning members brought into awning serving position by movement of said guides in one direction and moved into inoperative position by movement of said guides in the opposite direction.

4. An awning shutter for windows, including guides movable into and out of awning position, shutter elements associated therewith, guide supports moved by said guides into guide supporting position, and reversible devices cooperating with said guides and said supports, movable along the latter, and adjusted by means at one end of their travel for cooperating with said supports to prevent retrograde movement of said guides, and reversed by means at the other end of their travel for making them ineffective to prevent such movement.

5. A shutter device for windows, including a plurality of movable shutter sections, flexible carriers for said sections, guides for confining the movement of said sections to a predetermined path, and mechanism associated with said carriers and operable in one direction for moving said sections down said guides in spaced relation to each other and operable in the opposite direction for moving said sections at right angles to their planes into storage position.

6. A shutter device for windows, including a plurality of movable shutter sections, chain carriers to which said sections are pivoted, guides for confining the movement of said sections to a predetermined path, mechanism associated with said carriers for moving said sections down said guides in spaced relation to each other and capable of closing the spaces when the lowermost section has reached its lower limit of travel, and a locking device for holding said sections in contacting relation.

7. A shutter device for windows, including a plurality of shutter sections, guides therefor, chain carriers for said sections, pivot pins connecting each section to said carriers, and mechanism associated with said carriers for moving said sections along said guides in a predetermined plane and also out of relation with said guides at right angles to the planes of said sections into separate planes in closely packed storage position.

8. An awning shutter for windows, including a plurality of shutter sections, a pair of movable guides therefor, a pair of fixed guides below and in alignment with said movable guides, apparatus for moving said sections along said guides, horizontally movable locking devices, movable to operative and inoperative position, to prevent said sections from moving lower than said movable guides, mechanism for swinging said movable guides about a predetermined axis into awning position, and flexible awning members associated with said guides and brought into awning serving position by movement of said guides into awning position, and moved into inoperative position by movement of said guides out of awning position.

9. An awning shutter for windows, including a plurality of shutter sections, a pair of movable guides therefor, a pair of fixed guides below and in alignment with said movable guides, actuating apparatus for moving said sections along said guides and out of relation with said guides and at right angles to the planes of said sections into closely packed storage position, locking devices, movable to operative and inoperative position, to prevent said sections from moving lower than said movable guides, operating mechanism for swinging said movable guides about a predetermined axis into awning position, and flexible awning members associated with said guides and brought into awning serving position by movement of said guides into awning position, and moved out of awning serving position by movement of said guides out of awning position.

10. An awning shutter for windows, including a plurality of shutter sections, a pair of movable guides therefor, apparatus for moving said sections along said guides, mechanism for swinging said guides about a predetermined axis into awning position, and a horizontally movable thrust member for locking said sections in said guides in awning position.

11. An awning shutter for windows, including guides movable into and out of awning position, shutter elements associated therewith, guide supporting rods provided with notches and moved by said guides into guide supporting position, reversible slides connecting said guides to said rods, said slides including a notch-engaging pin and a pivoted spring pressed tail piece, means at the outer end of the travel of said slides for moving said tail piece to carry said pin freely past said notches during the inward travel of said slides without engaging therein, and means at the inner end of the travel of said slides for causing relative movement between said pin and said tail piece, thereby placing said pin in position to enter said notches.

12. An awning shutter for windows, including a plurality of shutter sections, a pair of movable guides therefor, actuating apparatus for moving said sections along said guides, mechanism for swinging said guides about a predetermined axis into awning position, guide supporting rods, and devices associated with said guides and said rods and cooperating with said actuating apparatus for locking said guides in awning position.

13. A shutter device for attachment on one side of a window, including a plurality of shutter sections, guides therefor, and mechanism operable from the other side of the window for moving said sections along said guides in spaced apart ventilating relation and subsequently out of relation with said guides into face to face contacting storage position.

14. An awning shutter for attachment on one side of a window, including a plurality of shutter sections, guides therefor, mechanism operable from the other side of the window for moving said sections along said guides, actuating apparatus operable from the same side of said window for moving said guides into and out of awning position, and guide braces moved by said guides into bracing and inoperative position.

15. An awning shutter for attachment on one side of a window, including a plurality of shutter sections, guides therefor, mechanism operable from the other side of the window for moving said sections along said guides in spaced apart ventilating relation and out of relation with said guides into storage position, actuating apparatus operable from the same side of the window for moving said guides into awning position and shutter position, and a horizontally movable locking element also operable from the last-named side of the window for locking said sections in said guides in shutter position.

16. An awning shutter for windows including guides movable into and out of awning position, shutter members associated therewith, guide supporting rods, slidable devices thereon and secured to said guides, elements preventing retrograde movement of said devices before they reach their limit of travel in either direction, and means for shifting said elements at each end of their travel to permit retrograde movement of said devices.

In testimony whereof we affix our signatures.

HERMAN A. BRANDT.
HUGO E. BRANDT.